United States Patent
Kanipakam et al.

(10) Patent No.: US 6,671,062 B1
(45) Date of Patent: Dec. 30, 2003

(54) JOURNALING TECHNIQUE FOR REVERSE ORDER PRINTING

(75) Inventors: Praveen K. Kanipakam, Vancouver, WA (US); James Misner, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/258,684

(22) Filed: Feb. 25, 1999

Related U.S. Application Data

(60) Provisional application No. 60/112,720, filed on Dec. 18, 1998.

(51) Int. Cl.[7] .............................. G06F 15/00; G06K 1/00
(52) U.S. Cl. .................. 358/1.15; 358/1.1; 358/1.9; 358/448; 358/1.17; 358/523; 358/1.13; 355/40
(58) Field of Search ................ 358/448, 1.1, 1.9, 358/1.15, 1.17, 523, 1.13; 355/40

(56) References Cited

U.S. PATENT DOCUMENTS

| | | | | |
|---|---|---|---|---|
| 5,018,080 A | * | 5/1991 | Inoue | 358/1.15 |
| 5,528,734 A | * | 6/1996 | Sanchez | 358/1.16 |
| 5,580,177 A | | 12/1996 | Gase et al. | 400/61 |
| 5,687,301 A | | 11/1997 | Stokes et al. | 395/112 |
| 5,696,685 A | | 12/1997 | Lee et al. | 364/464.18 |
| 5,715,379 A | * | 2/1998 | Pavlovic et al. | 358/1.13 |
| 5,731,879 A | * | 3/1998 | Maniwa et al. | 355/23 |
| 5,745,659 A | | 4/1998 | Rigau et al. | 395/102 |
| 5,772,340 A | | 6/1998 | Nunokawa et al. | 400/61 |
| 6,104,498 A | * | 8/2000 | Shima et al. | 271/301 |
| 6,201,610 B1 | * | 3/2001 | Ogino | 358/1.13 |
| 6,313,919 B1 | * | 11/2001 | Nakagiri et al. | 358/1.11 |
| 6,337,744 B1 | * | 1/2002 | Kuroda | 358/1.13 |
| 6,433,882 B1 | * | 8/2002 | Mori et al. | 358/1.13 |
| 6,570,668 B1 | * | 5/2003 | Misner | 358/1.15 |

FOREIGN PATENT DOCUMENTS

| | | | | |
|---|---|---|---|---|
| EP | 00895184 A2 | * | 2/1999 | G06K/15/00 |
| JP | 05064925 | * | 3/1993 | B41J/2/485 |

* cited by examiner

*Primary Examiner*—Kimberly A. Williams
*Assistant Examiner*—Ashanti Ghee
(74) *Attorney, Agent, or Firm*—Marger Johnson & McCollom, P.C.

(57) ABSTRACT

A method for reverse order printing. The control instructions that direct printing of a document on a printer are used to create journal files of the document, with each page of the document having its own journal file. The journal files are then accessed in reverse order and sent to the printer to produce the document in reverse order. In one embodiment, a frontend is used to trap the control instructions and then a player accesses the journal files. In another, the graphic device interface and the printer driver are used.

9 Claims, 1 Drawing Sheet

JOURNALING TECHNIQUE FOR REVERSE ORDER PRINTING

This application is a continuation of U.S. Provisional Application No. 60/112,720, filed Dec. 18, 1998, and claims priority thereto.

BACKGROUND OF THE INVENTION

1. Field of the Invention

This invention relates to printers, more particularly to printing with printers with face-up output.

2. Background of the Invention

Many different types of printers are available to users, with nearly unlimited combinations of features. One such feature is face-up printing. Some users prefer to have their documents printed face-up. The document is viewable by the user as it exits the printer into the output tray.

In some instances, the mechanical limitations of the print engine require that the printer output documents face up. The limitations can be due to the paper path, the fusing or toner process, or the inkjet application path for the paper.

Unfortunately, in some instances, face up output causes multi-page documents to end up in reverse order. Since the printer receives the document in the page order in which it was created, first through last, it then prints in that order. This results in page 1 being face up on the bottom of the stack of output, and the last page being face up on the top of the stack.

Therefore, a method is needed to reorder the printing for face up printers that allows the documents to be ordered correctly in the output tray.

SUMMARY OF THE INVENTION

One aspect of the invention is a method for reverse order printing. The instructions that would cause the document to be printed are used to create journal files, with one journal file per page of the document. The journal files are accessed in reverse order, allowing the printer to produce the document in reverse order at the printer. In one embodiment, a printer driver frontend is used to trap the control instructions and write them into journal files. A player is then used to access the journal files in reverse order and send them to the printer. In another embodiment, the graphic device interface and the printer driver are used to perform those operations.

This method can also be used to print in booklet form. The journal files are accessed in the proper order for the book to be printed correctly.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Most users print from their personal computer (PC) to a printer that is either directly connected or networked to that PC. The print command typically comes from an application, such as word processor, spreadsheet or other type of program. The application accesses a driver that formats the information to be printed for the appropriate printer.

The examples described below assume the PC is being operated in the Windows environment, whether that is Windows 3.1, Windows 95 or any other Windows version. However, while some Windows-specific terminology may be used, it should be noted that analogous types of functions will be found in other environments and therefore are not intended to limit the scope of the invention.

Figure 1:
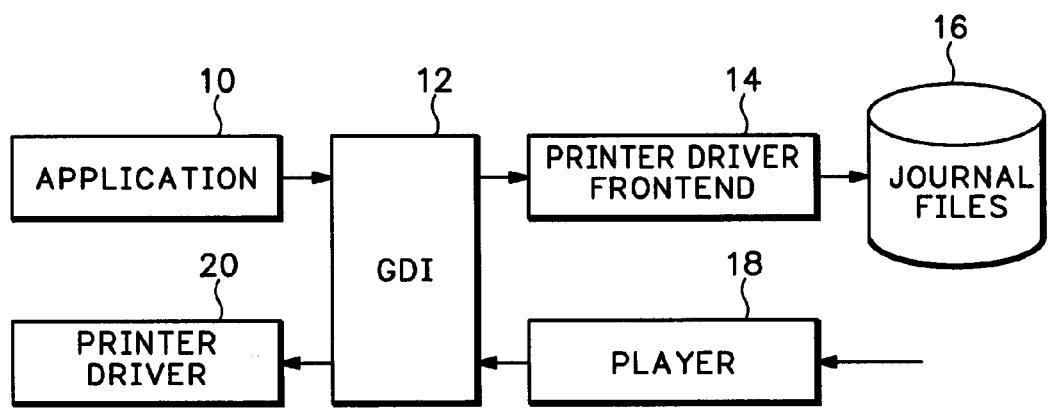
FIG. 1 shows a block diagram of one embodiment for reverse order printing in accordance with the invention.

One embodiment of a reverse order printing technique is shown in FIG. 1. The application 10 receives a print command from the user. The application then calls a graphic device interface (GDI) 12, which formats the data to be printed in the appropriate format. In typical printing systems, the GDI would call the printer driver directly and then the output would be produced. However, in order to produce the output in the correct (reverse) order, these calls are trapped by a printer driver frontend 14 in this embodiment.

The printer driver frontend 14 takes the calls and converts them into metafile records and written into the journal files 16. The creation of the metafile records occurs as the physical objects to be printed, such as pens, brushes, and fonts, are converted into logical objects. The metafile device context is created and the necessary objects are selected into the metafile context. The drawing operations are then placed into the metafile context. These operations write one page of a document into its own unique journal file.

At the beginning of the writing into the journal files 16, a journaling flag is set to TRUE. These writing operations continue until the end of the document is detected. The printer driver frontend then closes the journal files and set the journaling flag to FALSE. The frontend then releases the application 10 for the user and starts the player 18.

The player 18 reads the journal files in reverse order playing the last page first and ending with the first page last. The player creates a printer device context using the GDI 12 and then plays the journal file into the printer driver 20 to create the printed output. It is an advantage of this approach that the printer driver frontend 14 can release the application 10 after receiving the end of document notification. The application does not have to wait until the printer driver releases it.

In this embodiment, three binary files are created. The first is at the printer driver frontend 14, the second is at the player 18 and the third is at the printer driver 20. Disadvantages may exist because of this, since all three binary files must be tracked.

Figure 2:
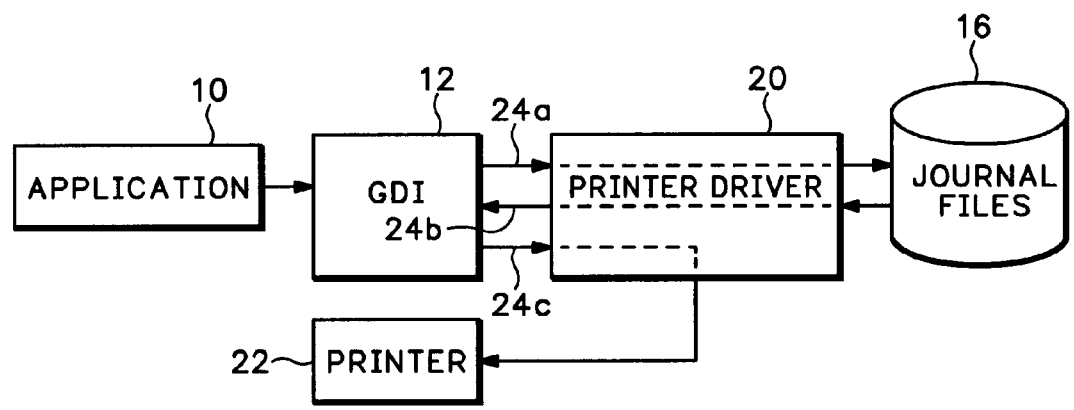
FIG. 2 shows a block diagram of another embodiment for reverse order printing in accordance with the invention.

An embodiment in accordance with the invention that does not require three separate binary files is shown in FIG. 2. The application 10 places the calls to the GDI 12, as was the case in the embodiment of FIG. 1. However, the embodiment of FIG. 2 uses the printer driver repeatedly, rather than going to a printer driver frontend and a player as in FIG. 1.

The GDI makes a first call to the printer driver 20 at call 24a. The printer driver 20 then sets a journaling flag to TRUE and creates the journal files 16, with one journal file per each printed page. When the end of the document notification is sent, the journaling flag is set to FALSE. The printer driver reads the documents out of the journal files 16 and calls the GDI at call 24b. Once the files are properly ordered, the printer driver 20 makes a final call to the GDI at call 24c and the pages are produced at the printer 22.

An advantage of this approach lies in its limitation on binary files. Only one set of binary files exists, the journal files 16. However, the use of the printer driver and GDI in repeated calls causes the application 10 to pause until the document is printed.

In summary, both embodiments of the invention write pages of the document to journal files and then access the journal files in the desired order to produce output in the correct format for a face-up printer. The desired order in this example is reverse order.

This application can be used to print other types of reverse orders. For example, booklet printing may use this technique. In an example booklet printing process, two pages are printed side by side on a piece of 11×17 paper, assuming the pages are 8½×11. For a 15-page booklet, pages 1 and a blank may reside on the same side of a sheet, as an example. The other side would have pages 2 and 15. The remaining pages are then printed out and the pages are stacked and folded in half. In this example, the desired order would be achieved by accessing the journal files in reverse order for pages 15–9, so it is still reverse order printing within the scope of the invention.

Another application of this invention would be duplex printing, where the printing is done on every other page. The page order requires that every other page be flipped to print on the back of the previous page. This same technique could be used to effect that type of printing.

Thus, although there has been described to this point a particular embodiment for reverse order printing, it is not intended that such specific references be considered as limitations upon the scope of this invention except in-so-far as set forth in the following claims.

What is claimed is:

1. A method of controlling a printer, comprising the steps of:
   sending control instructions to a printer from an application, wherein said control instructions direct printing of a document at a printer;
   converting said control instructions into records;
   writing said records directly into a journal file such that a page in said document is associated with a unique journal file;
   releasing the application;
   accessing each said unique journal file in a desired order;
   sending each said unique journal file to a printer in said desired order, thereby producing said document in desired order at said printer.

2. The method of claim 1, wherein said desired order is reverse order.

3. The method of claim 1, wherein said desired order is booklet order.

4. A method of controlling a printer, comprising the steps of:
   sending control instructions to a printer from an application, wherein said control instructions direct printing of a document at a printer;
   trapping said control instructions in a printer driver frontend;
   converting said control instructions into records;
   writing said records directly into a journal file such that a page in said document is associated with a unique journal file;
   receiving commands indicating the end of said document; and
   starting a player with said printer driver frontend such that said printer driver frontend prints said document in a desired order using said journal file.

5. The method of claim 4, wherein said desired order is reverse order.

6. The method of claim 4, wherein said desired order is book order.

7. A method of controlling a printer, comprising the steps of:
   sending control instructions to a printer from an application, wherein said instructions direct printing of a document at a printer;
   converting said control instructions into records using a graphic device interface;
   writing said records directly into a journal file using a printer driver such that a page in said document is associated with a unique journal file;
   releasing the application;
   accessing each said unique journal file with said printer driver in a desired order;
   using said printer driver to send said unique journal files to said printer, thereby printing a document in said desired order.

8. The method of claim 1, wherein said desired order is reverse order.

9. The method of claim 1, wherein said desired order is booklet order.

* * * * *

UNITED STATES PATENT AND TRADEMARK OFFICE
CERTIFICATE OF CORRECTION

PATENT NO. : 6,671,062 B1
DATED : December 30, 2003
INVENTOR(S) : Kanipakam et al.

It is certified that error appears in the above-identified patent and that said Letters Patent is hereby corrected as shown below:

<u>Title page,</u>
Item [56], References Cited, U.S. PATENT DOCUMENTS,
"5,528,734 A * 6/1996 Sanchez.......... 358/1.16" should read
-- 5,528,734 A * 6/1996 Sanchez.......... 358/115 --.

Signed and Sealed this

Fifth Day of October, 2004

JON W. DUDAS
*Director of the United States Patent and Trademark Office*